US008602202B2

(12) United States Patent
Van Den Goor et al.

(10) Patent No.: US 8,602,202 B2
(45) Date of Patent: Dec. 10, 2013

(54) SORTING DEVICE, IN PARTICULAR FOR PIECES OF LUGGAGE

(75) Inventors: Jacobus Marie Van Den Goor, Nuenen (NL); Martinus Johannes Maria Vertogen, Zeeland (NL); Johannes Petrus Maria Vissers, Eindhoven (NL)

(73) Assignee: Vanderlande Industries Nederland B.V., Veghel (NL)

( * ) Notice: Subject to any disclaimer, the term of this patent is extended or adjusted under 35 U.S.C. 154(b) by 0 days.

(21) Appl. No.: 13/611,680

(22) Filed: Sep. 12, 2012

(65) Prior Publication Data

US 2013/0001043 A1    Jan. 3, 2013

Related U.S. Application Data

(62) Division of application No. 12/525,238, filed as application No. PCT/NL2008/000032 on Jan. 30, 2008, now Pat. No. 8,297,430.

(30) Foreign Application Priority Data

Jan. 31, 2007  (NL) ..................................... 1033313

(51) Int. Cl.
    *B65G 47/10*    (2006.01)
(52) U.S. Cl.
    USPC .... 198/370.02; 198/890; 198/375; 198/463.2
(58) Field of Classification Search
    USPC ......... 198/890, 370.02, 375, 463.2, 351, 353, 198/832, 833, 738; 209/653
    See application file for complete search history.

(56) References Cited

U.S. PATENT DOCUMENTS

| 3,156,170 | A | * | 11/1964 | Behrens et al. ............... 404/101 |
| 3,333,675 | A | | 8/1967 | Lord |
| 3,710,923 | A | | 1/1973 | Fromme et al. |
| 4,128,163 | A | | 12/1978 | Rana et al. |
| 4,619,204 | A | * | 10/1986 | Lindquist ..................... 104/166 |
| 4,732,260 | A | | 3/1988 | Canziani |
| 4,982,556 | A | | 1/1991 | Tisma |
| 5,052,544 | A | | 10/1991 | Anderson |
| 5,188,217 | A | | 2/1993 | Bruno |
| 5,427,223 | A | | 6/1995 | Van Den Goor |
| 5,435,429 | A | | 7/1995 | Van Den Goor |
| 5,653,324 | A | | 8/1997 | Toeniskoetter |
| 5,657,858 | A | | 8/1997 | Van Den Goor |
| 5,722,532 | A | | 3/1998 | Troisi et al. |
| 5,894,918 | A | | 4/1999 | Bonnet |
| 5,909,797 | A | | 6/1999 | Van Den Goor |
| 6,220,427 | B1 | | 4/2001 | Ratz et al. |

(Continued)

FOREIGN PATENT DOCUMENTS

EP  1 167 248  1/2002
FR  2 388 737  11/1978

*Primary Examiner* — Joseph Dillon, Jr.
(74) *Attorney, Agent, or Firm* — Oblon, Spivak, McClelland, Maier & Neustadt, L.L.P.

(57) ABSTRACT

A sorting device for sorting products, for example pieces of luggage, including a removing mechanism moving the product to be sorted off the supporting surface at a desired sorting location, wherein the removing mechanism includes a pusher element and a moving mechanism moving the pusher element laterally at a sorting location so as to have the pusher element push the product to be sorted off the supporting surface. The removing mechanism further includes two guides each sorting unit for guiding two respective guide members of the pusher element during the lateral movement of the pusher element.

19 Claims, 6 Drawing Sheets

(56) References Cited

U.S. PATENT DOCUMENTS 6,974,019 B2 12/2005 Lapeyre et al.
7,240,781 B2 7/2007 Ramaker et al.
7,568,572 B2 8/2009 Zeitler et al.

* cited by examiner

SORTING DEVICE, IN PARTICULAR FOR PIECES OF LUGGAGE

CROSS-REFERENCE TO RELATED APPLICATIONS

The present application is a divisional of U.S. application Ser. No. 12/525,238 filed on Nov. 2, 2009, which is based on PCT/NL08/000032, and which claims priority to Netherlands Patent Application 1033313 filed on Jan. 31, 2007, the entire contents of each of which are hereby incorporated herein by reference in their entirety.

The present invention relates to a sorting device for sorting products, in particular pieces of luggage, comprising a number of sorting units, conveying means for moving the sorting units in a conveying direction along a conveying path, said sorting units each comprising a carrier provided with a supporting surface for supporting a product to be sorted, said sorting device further comprising removing means for moving the product to be sorted off the supporting surface at a desired sorting location, wherein the removing means comprise a pusher element associated with a sorting unit disposed above an associated supporting surface, as well as moving means for moving the pusher element laterally at a sorting location so as to have the pusher element push the product to be sorted off the supporting surface, wherein the removing means comprise two guides for each sorting unit for guiding two respective guide members of the pusher element during said lateral movement of the pusher element, wherein the moving means comprise at least one stationary guide disposed under the supporting surface at a sorting location, which guide extends at an angle to the conveying direction, as well as at least one guide element connected to a pusher element for each sorting unit for guiding cooperation of said at least one guide element with said at least one stationary guide during transport of the sorting unit. The invention is in particular directed at sorting pieces of luggage, without categorically excluding the use of the invention for other types of products, such as packages. It is a specific feature of pieces of luggage that they run a greater risk of catching on something because of the projecting parts such as straps and handles that pieces of luggage usually have. In addition to that, pieces of luggage typically have a weight between 10 kg and 30 kg.

From European patent application EP 1 411 008 A1 a so-called tilt-tray sorting device is known, in which an endless train of sorting units is used. Each sorting unit has a chassis and a carrier deck, which is capable of lateral tilting movement relative to the chassis. Each sorting unit is provided with an electric motor for tilting the carrier deck. Tilting the carrier deck makes it possible to cause a product supported by the load-bearing deck to slide off the load-bearing deck at a sorting location. A risk that plays a role in this regard is that a piece of luggage will catch on something or stick to the load-bearing deck while being handled, for example because a strap catches on a corner of the carrier deck or because a piece of luggage is wet or wrapped in shrink foil, as a result of which the piece of luggage will remain present on the carrier deck or slides off the tilting deck at least in an uncontrolled direction rather than in lateral direction in spite of the tilting of the carrier deck, as a result of which the correct functioning of an upstream sorting unit, of a downstream sorting unit or of the sorting unit in question itself, and thus of the entire sorting device will be at risk. Another drawback of the known sorting device is the fact that it is relatively costly, in particular for applications where a limited number of pieces of luggage are to be handled, for example 3000 pieces of luggage per hour, which is a usual capacity at medium-sized airports.

A sorting device as referred to in the introduction is known from U.S. Pat. No. 4,732,260. Said document discloses a sorting device comprising a plurality of elongated plates positioned one behind the other, which are oriented transversely to a conveying direction, which plates follow an endless conveying path in the vertical plane. The upper sides of the upper halves of the plates each form a supporting surface for a product to be sorted. A pusher element is provided for each plate, which pusher element is capable of reciprocating motion transversely to the conveying direction between two opposite ends of the respective plate for thus pushing a product off the plate at a sorting location. The pusher element is to that end connected, via a slot in the associated plate, to a block-shaped driving element present on the opposite side of the plate. Said driving element is provided with two bores, through which two guides extending transversely to the conveying direction and being rigidly connected to the plate in question are movable. A guide element provided with three rollers arranged one behind the other, which rollers are to cooperate with the aforesaid stationary guide, is mounted under the driving element via a vertical pivot pin. An important drawback of this known sorting device is that it is not suitable for sorting pieces of luggage. From a practical viewpoint this is caused by the fact that the slot that is present in each plate for the necessary connection between the pusher element on the outer side of the plate and the driving element on the inner side of the plate constitutes the risk that projecting parts, such as straps and handles of pieces of luggage will get stuck therein. From an economic viewpoint there is furthermore the fact that the device is too expensive for being used in an economically sound manner with pieces of luggage, in which connection it should be realised that in view of the dimensions of each plate, seen in the conveying direction, a relatively large number of plates provided with the associated parts as described above are needed. In addition to that, the pusher elements associated with a number of successive plates move from one side of the sorting device to the opposite side transversely to the conveying direction upon sorting out a piece of luggage, to which end the guide elements associated with the pusher elements in question move along the same stationary guides. During this movement, the pusher elements jointly form a pushing plane oriented at an angle to the conveying direction, causing the orientation of the pieces of luggage on the associated plates to change. This is not always desirable. Another important drawback is the risk that the pusher element tends to take up an oblique position as soon as a force is exerted thereon at an off-centre location along the length of the pusher element. This will adversely affect the guiding cooperation between the transverse guides and the two bores in the driving element and result in increased mechanical resistance and thus extra wear on various related parts. This adverse effect becomes stronger as the length of the pusher element increases.

The object of the present invention is to provide a sorting device which is capable of sorting products, such as in particular pieces of luggage, with a high degree of reliability and whose cost price, in particular if sorting capacities of about 1500 to 3000 products per hour are to be realised, is comparatively low. In order to accomplish that object, the sorting device according to the present invention is in the first place characterised in that said moving means comprise two guide elements for each sorting unit, which guides are connected to the respective two guide members associated with the pusher element and which are each arranged for guiding cooperation with said at least one stationary guide. Using two guide elements for each sorting unit, which guide elements are each connected to one of the two guide members associated with the pusher element in question, achieves that the forces acting on the pusher element when a product to be sorted is being pushed off the supporting surface by the pusher element can be taken up as well as possible, even if the dimensions of the pusher elements, seen in the conveying direction, are comparatively large, for example about 100 cm. The invention moreover makes it possible to sort comparatively large products, such as pieces of luggage, by means of a sorting device as referred to in the introduction, without the product in question taking up a different orientation on the supporting surface during said sorting.

Preferably, the two guide elements are pivotally connected to the associated guide members about respective vertical pivot axes. As a result, the cooperation between the guide elements on the one hand and the stationary guide on the other hand can take place along a relatively long part of the stationary guide without any problem, thus making it possible to bridge interruptions in the stationary guide.

A very stable operation is obtained if the two guide members are provided on two opposite ends of the associated pusher element.

The same advantage is obtained if the two guide elements are provided directly below the respective associated guide members and/or if the two guide elements are provided directly below the guides associated with the associated guide members.

In another preferred embodiment of the device according to the invention, at least one guide member is pivotally connected to another part of the pusher element about a further pivot axis extending perpendicularly to the associated supporting surface, or, more preferably, the two guide members are pivotally connected to another part of the pusher element about two respective further pivot axes extending perpendicularly to the associated supporting surface. This leads to an increased flexibility as regards the angular position that the pusher element assumes, or at least is capable of assuming, during the lateral movement of the pusher element. This in turn leads to the additional advantage that the orientation in which a product is pushed off the supporting surface by the pusher element can be optimally geared to the characteristics of the sorting location in question, more specifically the manner and/or the direction in which the products are discharged at that location for further transport.

The characterising features of the present preferred embodiments are also advantageous when applied in sorting devices according to the prior art. Within this framework the present invention also provides a sorting device for sorting products, in particular pieces of luggage, comprising a plurality of sorting units, conveying means for moving the sorting units in a conveying direction along a conveying path, said sorting units each comprising a carrier having a supporting surface for independently supporting products to be sorted, said sorting device further comprising removing means for moving the product to be sorted off the supporting surface at a desired sorting location, wherein the removing means comprise a pusher element associated with a sorting unit disposed above an associated supporting surface, as well as moving means for moving the pusher element laterally at a sorting location so as to have the pusher element independently push the product to be sorted off the supporting surface, wherein the removing means comprise at least one guide for each sorting unit for guiding a guide member of the pusher element during said lateral movement of the pusher element, and wherein at least one guide member is pivotally connected to another part of the pusher element about a pivot axis extending perpendicularly to the associated supporting surface.

When two guide members are used, as described above, the removing means furthermore preferably comprise two guides for each sorting unit for guiding two respective guide members of the pusher element during said lateral movement of the pusher element, wherein the two guide members are pivotally connected to another part of the pusher element about two respective further pivot axes extending perpendicularly to the associated supporting surface.

The aforesaid flexibility is further enhanced if at least one guide member is slidably connected, in a direction parallel to the supporting surface, to another part of the pusher element, or alternatively, or even in combination therewith, the length of the pusher element is variable, in which case the pusher element is preferably of the telescopic type. In this way it is possible to change the spacing between two guide members during the lateral movement of the pusher element.

To enable the pusher element, whose longitudinal direction extends parallel to the conveying direction, to move laterally in a very stable manner it is in particular preferable if the moving means comprise two successive stationary guides disposed under the supporting surface at a sorting location, which guides extend at an angle to the conveying direction, with which two guides the two respective guide elements can cooperate simultaneously during transport of the sorting unit, to which end the two stationary guides preferably extend parallel to each other.

If two guides are used, said guides are preferably provided on two opposite sides, seen in the conveying direction, of the associated supporting surface. Thus the bending moments acting on the pusher element can be reduced as much as possible, so that said pusher element can be designed to be as light as possible.

In a preferred embodiment which is constructionally advantageous because of its relative simplicity and low cost price, the two guide elements are preferably directly connected to the two respective guide members.

Again with a view to obtaining a lower cost price, it is preferable if the conveying means comprise a driven chain, to which each of the sorting units is connected.

The conveying means preferably comprise friction-type drive means, which frictionally engage flanks of the chain for driving the chain.

In order to have the sorting units follow the conveying path as determined by the course of the chain as accurately as possible also in bends, it is preferable if the sorting units are pivotally connected to the chain about still further pivot axes extending perpendicularly to the supporting surface at two connecting positions located one behind the other, seen in the conveying direction, whilst the sorting units are slidably connected to the chain at the location of at least one of the two connecting positions.

The chain advantageously extends centrally below the sorting units, seen in a direction transversely to the conveying direction, so that on the one hand the sorting units of the sorting device can readily pass through bends both to the left and to the right, whilst on the other hand the load on the chain can in principle be symmetrical, which is advantageous in connection with the bending moments acting on the chain.

In particular for use in sorting pieces of luggage it is highly preferable if the supporting surface is a closed surface. In the case of a closed surface, with no holes of slots in the supporting surface, there is a reduced risk of projecting parts of pieces of luggage, including labels attached to pieces of luggage, catching on something when the piece of luggage in question is being pushed off the supporting surface by the pusher element.

Another very advantageous preferred embodiment of the invention is characterised in that a supply conveyor is provided for supplying products to be sorted to a sorting unit, with a downstream end of said supply conveyor terminating at a higher level than the upper side of pusher elements passing the downstream end of the supply conveyor. This makes it possible to load the supporting surface with a product to be sorted by passing it over a pusher element, as a result of which the product to be sorted can eventually be sorted out on the opposite side of the conveying path, so that the device is no longer limited to sorting out the product to be sorted only on the side of the conveying path where the supply conveyor is disposed.

To prevent the product to be sorted from coming into contact with a pusher element already while a sorting unit is being loaded, which might lead to an undesirably high load on the pusher element, it is furthermore preferable if the downstream end of the supply conveyor at least partially extends directly above a part of the passing pusher elements.

According to another aspect of the invention, which might also be applied in sorting devices not comprising a pusher element provided with the associated features as described above, a preferred embodiment of the invention is characterised in that the sorting units are each provided with a closing element both at a front end and at a rear end of the carrier for closing the gap between the carrier and an adjacent carrier, wherein closing elements of successive sorting units partially overlap and have an at least substantially convex edge at their facing sides, at least on one longitudinal side of the sorting units. The closing elements between the carriers of successive sorting units reduce the risk of objects to be sorted or other objects getting between the sorting units, possibly resulting in a malfunction at that location, or of the object in question being damaged. The convex shape of the edges (on one or both longitudinal sides of the sorting units) enables the sorting units to pass also through curvilinear parts of a conveying path, seen in top plan view, without parts of successive sorting units colliding with each other.

A further improvement as regards the risk of objects getting between the carriers of successive sorting units is realised if the convex edges of closing elements of successive sorting units define at least substantially triangular areas within the width of the sorting units in a rectilinear part of the conveying path on at least one of the longitudinal sides of the sorting units, which areas are at least partially closed by a further closing element, which is movably connected to one of said closing elements. The movable connection between a further closing element and a closing element can be used advantageously when moving through a curvilinear part of the conveying path, during which movement the form of the triangular areas gradually changes. Said changing form can be followed, as it were, by the movable further closing element.

From a constructional viewpoint it is preferable in that regard if said further closing element is pivotally connected to one of the closing elements about a vertical closing pivot axis, wherein said further closing element is furthermore preferably segmental in shape and said vertical closing pivot axis extends near the point of the segmental form.

Said further closing element preferably abuts against a stop member under spring pressure, as a result of which said further closing element tends to return to the position in question.

The advantages of the present invention manifest themselves in particular if the sorting units are pivotally interconnected about a vertical pivot axis.

The invention will now be explained in more detail by means of a description of preferred embodiments of a sorting device according to the invention, in which reference is made to the following figures.

FIG. 4a shows two sorting units according to FIG. 2 in the environment in which they are used;

FIG. 4b shows a detail of FIG. 4a;

Figure 1:
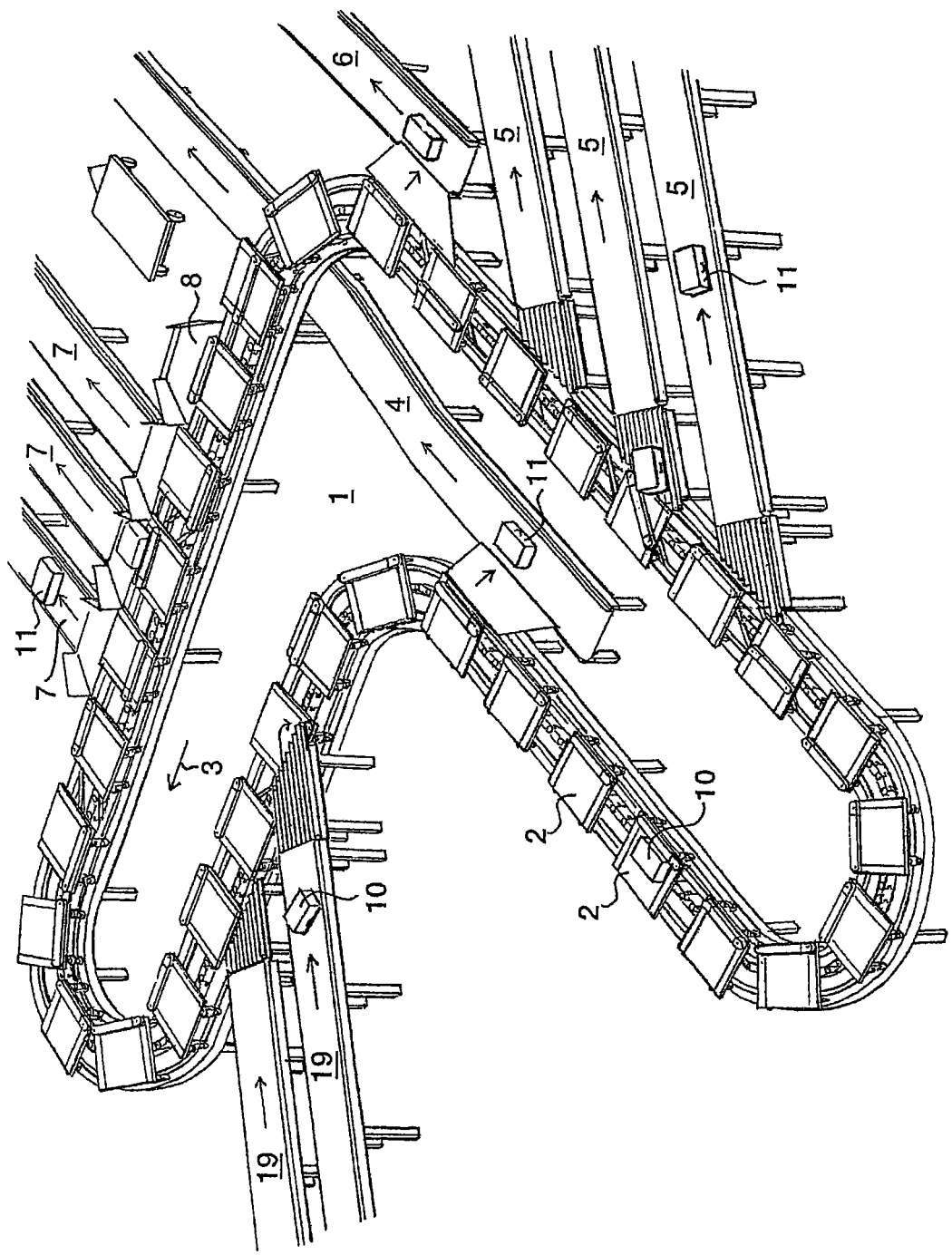
FIG. 1 shows a sorting device according to a preferred embodiment of the present invention.

FIG. 1 shows a sorting device 1 according to a preferred embodiment of the invention. The sorting device 1 comprises an endless train of sorting units 2, which will be explained in more detail yet in particular with reference to FIGS. 2 and 3. The sorting units 2 follow an endless conveying path in the conveying direction 3, which path comprises a number of bends in the horizontal plane and which might in principle also comprise bends in the vertical plane, as will be explained in more detail yet with reference to FIG. 3, so that the conveying path could extend at different vertical levels.

On the outer side of the conveying path two supply conveyors 19 connect to the train of sorting units 2, by means of which supply conveyors products 10 to be sorted can be supplied to a sorting unit 2 in a synchronized manner for loading the same. Within the framework of the present invention, said supplying of a product 10 to be sorted to a sorting unit 2 may also take place manually or from above, in which case a supply conveyor extends directly above a part of the conveying path at the location of a downstream end of said supply conveyor, without interfering with the passage of products 10 to be sorted on a sorting unit 2.

With the sorting device 1 a number of discharge conveyors branch off the conveying path for discharging sorted products 11, possibly by way of a chute. On the inner side of the conveying path this is the parallel discharge conveyor 4, whilst on the outer side of the conveying path there are successively provided three oblique discharge conveyors 5, a parallel discharge conveyor 6 and three perpendicular discharge conveyors 7, downstream of which only a chute 8 is furthermore provided, without a discharge conveyor connecting thereto. The sorting device 1 further comprises a control system (not shown), which is capable of pushing a product present on the sorting unit 2 off said sorting unit 2, in a manner yet to be described in more detail, at a desired discharge conveyor 4-7, so that said product is discharged via the discharge conveyor 4-7 in question.

Figure 2:
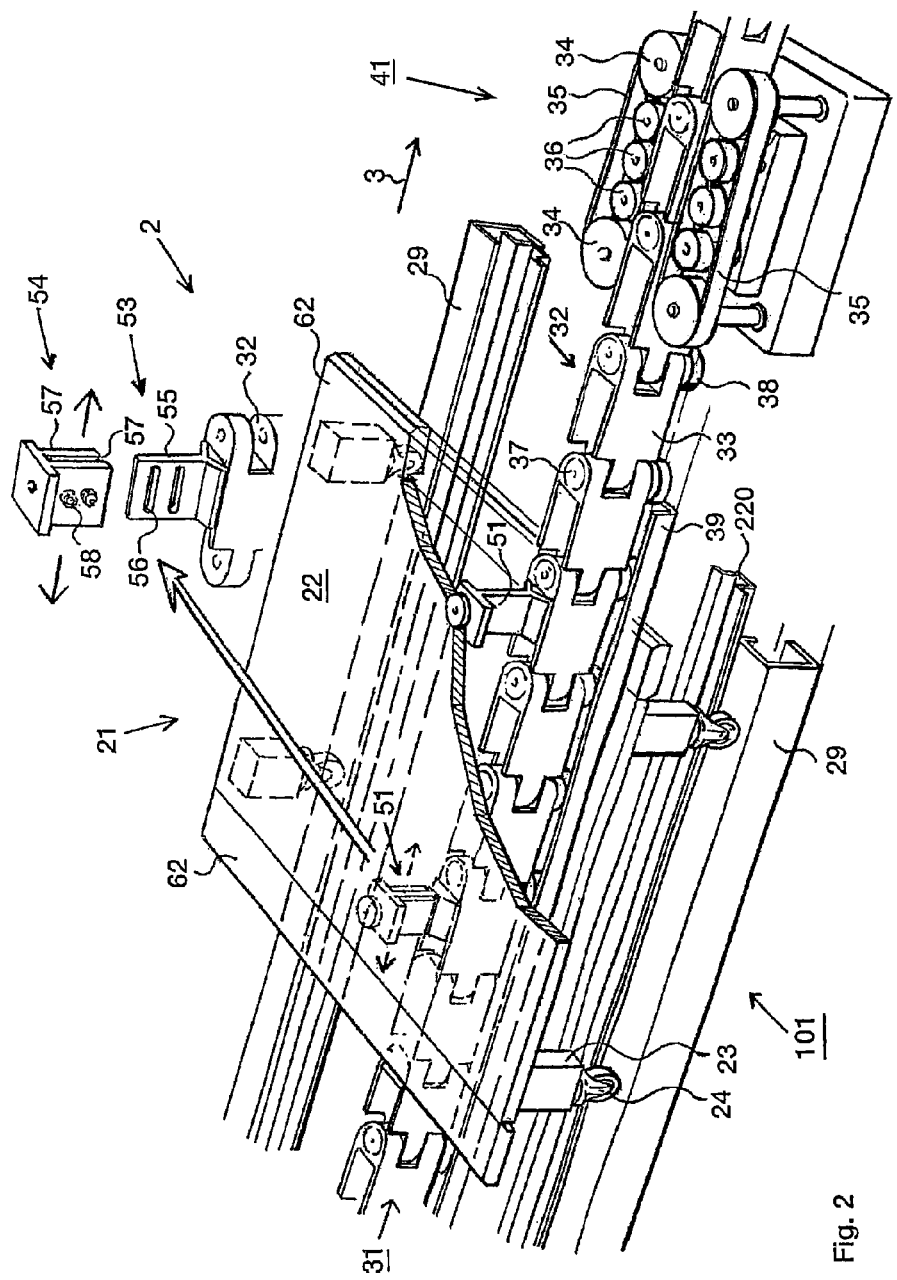
FIG. 2 shows a (part of a) sorting unit forming part of the sorting device according to FIG. 1 in the environment in which it is used.

FIG. 2 is a more detailed view of a part of a sorting unit 2, including the part of the sorting device 1 near the sorting unit 2 in question, for the sake of clarity without an associated pusher element yet, which will be discussed in more detail yet with reference to FIGS. 4a and 4b. The sorting unit 2 comprises a carrier plate 21 with a supporting surface 22 on the upper side thereof. The length of the supporting surface 22, seen in the conveying direction 3, is about 100 cm. Legs 23 are provided at the bottom side of the rectangular carrier plate 21, near the corner points thereof. Casters 24 are mounted to the underside of the legs 23. The carrier plate 21 is supported on rail sections 29 via the legs 23 and the associated casters 24, which rail sections 29 extend along the conveying path.

A conveyor chain 31 comprising links 32 extends centrally below the carrier plate 21. The links 32 are pivotally interconnected about vertical pivot axes 37. Provided on the bottom side of each link is a guide wheel 38, which extends between the two upright legs of a U-shaped guide section 39, which extends in an endless path and which defines the conveying path. A driving device 41 is provided for driving the chain 31. The driving device 41 comprises friction belts 35 passed over pulleys 34, which engage flat side flanks 33 of the chain 31. To effect an increased contact pressure between the friction belts 35 and the side flanks 33 of the links 34 of the chain 31, the driving device 41 comprises pressure rollers 36, which press the friction belt 35 against the side flanks 33 under spring tension. On each of the longitudinal sides of the chain 31, one of the pulleys 34 is driven by a driving motor (not shown). Several driving devices 41 may be provided in spaced-apart relationship, depending in part on the length of the conveying path.

At its bottom side the carrier plate 21 is connected to a link 32 of the chain 31 via connecting arms 51 and 52. The connection between the connecting arms 51 and 52 on the one hand and the carrier plate 21 on the other hand is such that the carrier plate can pivot about a vertical axis with respect to the connecting arm 51, 52 in question. It will be understood that such pivoting could also be realised via the connection between the respective link 32 and the respective connecting arm 51, 52 or in the connecting arm 51 itself.

The connecting arm 52 is made up of two portions 53, 54. The lower connecting arm portion 53 is connected to a link 32 and comprises an upright strip 55 in which two horizontal, parallel slotted holes 56 are provided. The upper connecting arm portion 54 comprises two strip members 57 spaced some distance apart. The strip member 55 of the lower connecting arm portion 53 extends between the strip members 57 of the upper connecting arm portion 54. The two connecting arm portions 53, 54 are connected via two bolt-nut combinations 54, the respective bolts of which extend through the respective slotted holes 56. Thus the upper connecting arm portion 54 can move reciprocatingly parallel to the conveying direction with respect to the lower connecting arm portion 53, so that passage through bends is possible in spite of the fact that the carrier 21 is connected to the chain 31 at two successive positions, in which bends the connecting arm portions 53, 54 will move relative to each other, therefore.

The sorting unit 2 further comprises guides 61, 62 at the front side and the rear side, respectively, of the carrier plate 21, which guides extend transversely to the conveying direction 3. The guides 61, 62 directly connect to the carrier plate 21, which means that no chinks on which the products to be sorted might catch are present between the guides 61, 62 on the one hand and the carrier plate 21 on the other hand.

Figure 3:
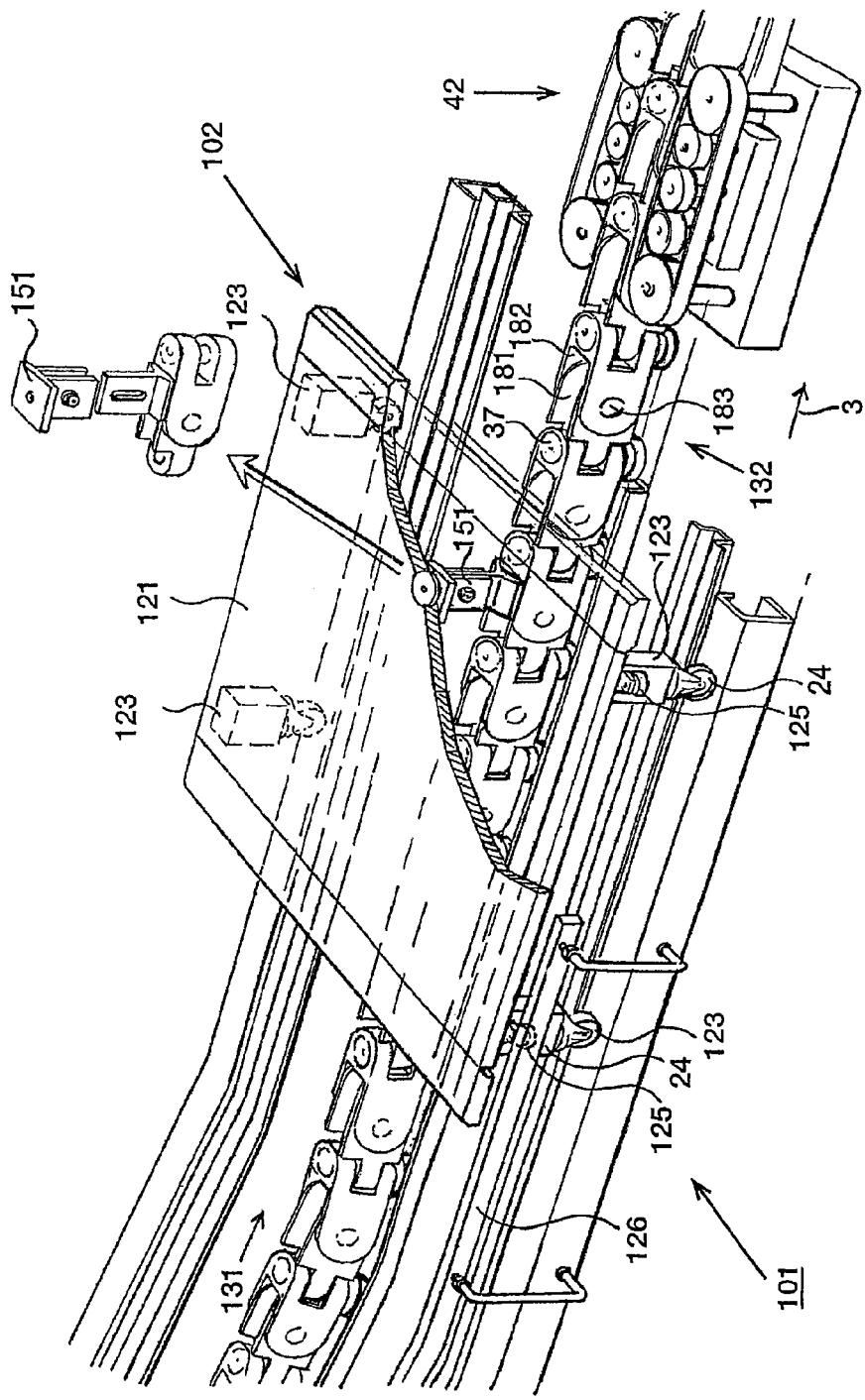
FIG. 3 shows an alternative embodiment for the sorting unit shown in FIG. 2, which forms part of an alternative embodiment of a sorting device shown in FIG. 1.

FIG. 3 shows a sorting unit 102 which is used in a sorting device 101. The sorting device 101 and the sorting units 102 are to a significant extent comparable to the sorting device 1 and the sorting units 2, respectively. In FIG. 3 corresponding elements are therefore indicated by the same numerals as in FIG. 2, and a more detailed description of said elements need not be given.

The carrier plate 121 is connected to the chain 131 via one extendable connecting arm 151 instead of by two connecting arms. Guide wheels 125 are provided on the outer sides of the legs 123 for guiding the sorting units 102 in the conveying direction 3. The guide wheels 125 run against two opposite guide strips 126, one of which is shown along a limited part of the length of the conveying path in FIG. 4a, but which may actually extend the entire length of the conveying path and which help to ensure that the casters 24 will continue to run on the rail sections 29. The links 132 of the chain 131 each consist of two link portions 181, 182, which are pivotally interconnected not only about the vertical pivot axis 37 but also about the horizontal pivot axis 183. This enables the chain 131 to extend in a three-dimensional path, as a result of which also the conveying path may be three-dimensional. More specifically, the chain 131 makes it possible to design the conveying path associated with the sorting device 101 to include vertical bends as well, as is shown on the left-hand side in FIG. 3.

Figure 4:
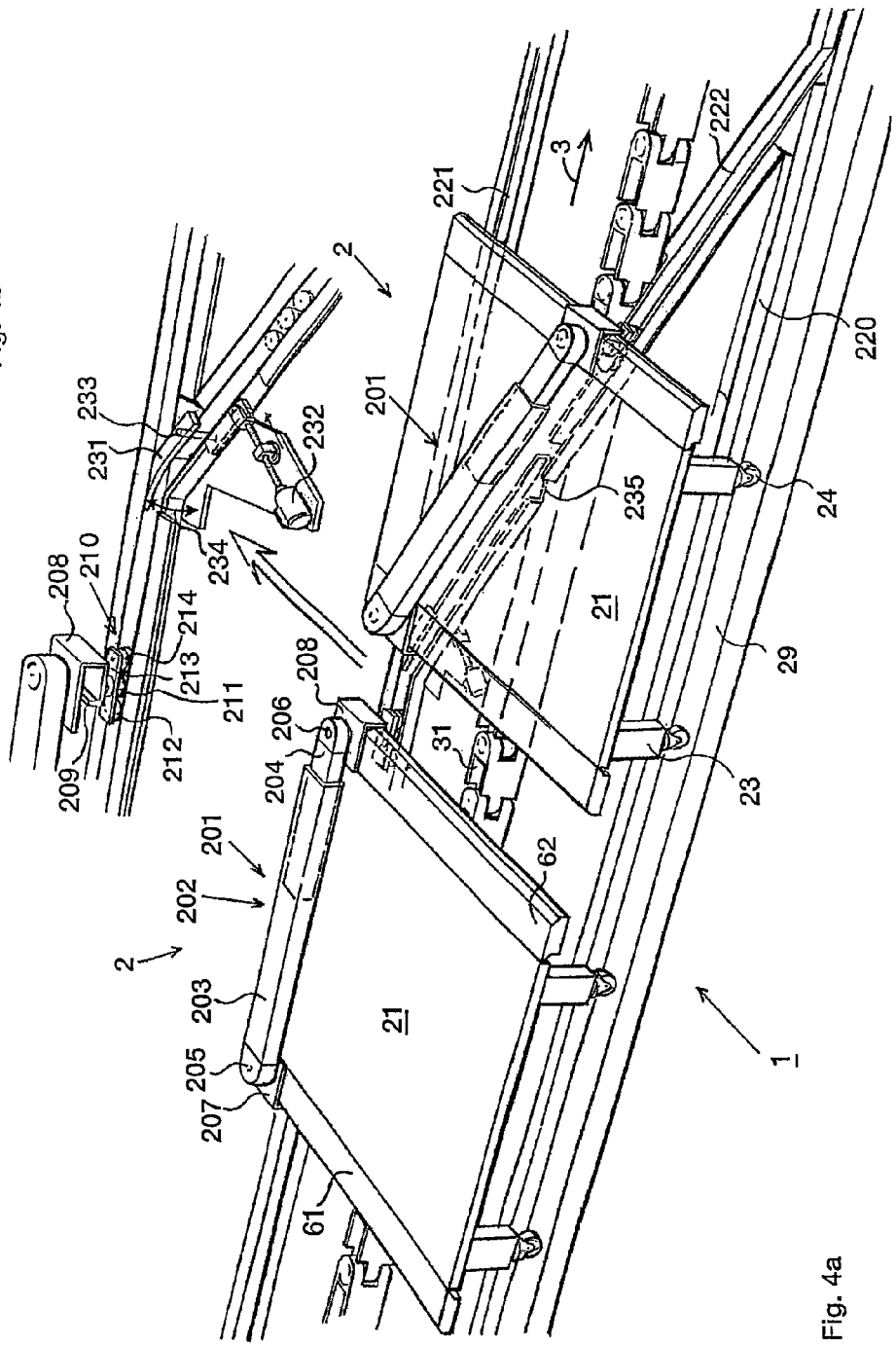

FIG. 4a shows two successive sorting units 2, including an associated pusher element 201. The pusher element 201 moves along with its associated sorting unit 2 along the entire length of the conveying path. The pusher element 201 comprises a telescopic push arm 202, which extends just above the carrier plate 21, along the entire length thereof. The push arm 202 is of the telescopic type and comprises a hollow arm portion 203 at one end and an arm portion 204 inserted into the hollow arm portion 203 at the other end. Alternatively, two telescoping sections, for example U-shaped sections, might be used. At its ends the push arm 202 is pivotally connected to at least substantially horizontal U-shaped guide members 207, 208, respectively, about vertical pivot axes 205, 206. The guide members 207, 208 are arranged for guiding cooperation with guides 61, 62, respectively, associated with the sorting unit 2 in question for guiding the respective guide members 207, 208 in a direction transversely to the conveying direction 3, parallel to the longitudinal direction of the guides 61, 62. The exact manner in which the guide members 207, 208 co-operate with the guides 61, 62 is not essential within the framework of the present invention. Said guidance might be realised via a sliding contact, for example, but also by using guide rollers. It is important, however, that the spacing between the guide member 207 and the guide member 208, seen in the conveying direction 3, remains constant, to which end a guide groove (not shown) may be provided in the bottom side of the guides 61, 62, in which guide groove the upright edge 209 present on the lower horizontal leg of the guide members 207, 208 extends (see FIG. 4b). In this way a form-locked guidance is realised.

At the bottom side of each of the guide members 207, 208, a guide element configured as a mounted axle 210 is pivotally connected to the lower leg of each of the guide members 207, 208 about a vertical pivot axis. The pivot axes in question coincide with the pivot axes 205, 206. The mounted axle 210 comprises a strip 211 with three guide wheels 212, 213, 214 arranged one behind the other mounted thereunder. The guide wheels 212, 213, 214 normally run in one of the two at least substantially U-shaped guide sections 220, 221 disposed on either side of the conveyor chain 31, which may extend along the entire length of the conveying path on either side of the guide section 39. A stationary guide 222 in the form of a U-shaped section extends below the carrier plate 21 but above the chain 31, at an angle to the conveying direction, at a sorting location, more specifically at the location of a discharge conveyor 4-7. The stationary guide 222 forms a connection between the two guide sections 220, 221. At the location where the stationary guide 222 branches off the guide section 221 a switch 231 is provided, which can be pivoted forward and backward about the vertical pivot axis 233 in the directions indicated by the double arrow 234 by suitably energizing the actuator 232.

In the position of the switch 231 shown in FIG. 4b, the mounted axle 210 will move into the stationary guide 222, causing the guide member 208 to move from the guide section 221 towards the guide section 220 during movement of the sorting unit 2 in question in the conveying direction 3. Since the spacing between the guide members 207 and 208 at least initially increases in an absolute sense, the length of the push arm 202 will likewise increase as a result of the arm portion 204 telescoping out of the hollow arm portion 203.

In order to enable the connecting arms 51, 52 to pass the stationary guide 222, said guide is interrupted over a short distance in the centre of its length, at the location indicated at 235. Since the mounted axle 210 is provided with three guide wheels 212, 213, 214 arranged one behind the other, the guiding cooperation between the mounted axle 210 and the stationary guide 222 will be maintained also at the location of the interruption 235. Since the guide member 208 will move in a direction transversely to the conveying direction 3 from the guide section 221 to the guide section 220, the push arm 202 will take up an oblique orientation relative to the conveying direction 3. Upon passage of the mounted axle 210 associated with the rear guide member 207, the guide member 207 will also move into the stationary guide 222, with the push arm 202 extending in the same orientation directly above the stationary guide 222.

After the mounted axle 210 of the rear guide member 207 has passed the switch 231, energizing the actuator 232 will return the switch 231 to the position in which the switch 231 extends on the inner side of the guide section 221 and a next mounted axle will pass the switch 231 and continue to move in the guide section 221.

Since the stationary guide 222 connects to the guide section 220, the mounted axles 210 associated with the respective guide members 208, 207 will move into the guide section 220 at a location past the stationary guides 222, during which passage the arm portion 204 will telescope into the hollow arm portion 203 and the push arm 202 will assume a shorter length again.

Alternatively it is also conceivable for the push arm 202 to have a fixed length, for example a length equal to the length that the push arm 202 has at the front sorting unit 2 in FIG. 4a, in which the push arm 202, besides being pivotally connected to the guide members 207, 208, is also slidably connected to one of said guide members 207, 208. This would mean, however, that the push arm 202 would extend on the front side of the guide 62 and/or on the rear side of the guide 61 to a limited extent, which might lead to two successive push arms 202 coming into contact with each other in inside bends if the push arms are positioned on that side of the bend. To solve this problem, push arms 202 might be configured in such a manner that they can nest together, at least in an overlap area.

Figure 5:
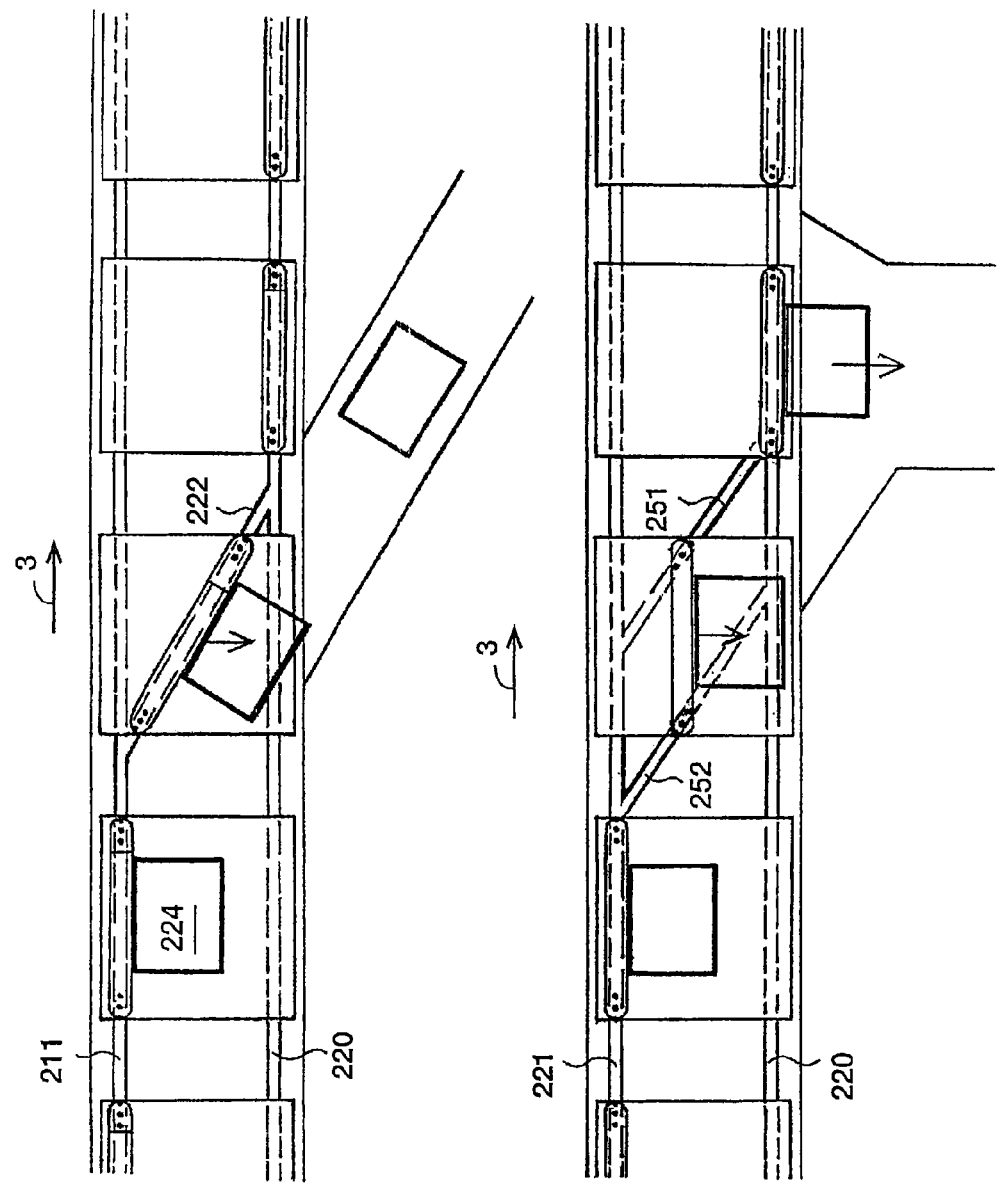
FIGS. 5a and 5b show two different uses of a sorting device according to the invention.

FIG. 5a shows how products, such as pieces of luggage 224, can be sorted out at a sorting location by the push arm 202 pushing the product 224 off the supporting surface 22 of the carrier plate.

FIG. 5b shows an embodiment which has been modified to a limited extent, in which two parallel stationary guides 251, 252 are used at a sorting location instead of one stationary guide 222. Switches are provided at the location where the stationary guides 251, 252 branch off the guide section 221, such as the switch 231 that has been explained above with reference to FIG. 4b. By suitably controlling said switches it is possible to have the mounted axles 210 associated with a sorting unit 2 run into the various stationary guides 251, 252 simultaneously, as a result of which the push arm 202 remains oriented parallel to the conveying direction 3 during lateral movement thereof transversely to the conveying direction 3, which leads to an advantageous situation in particular in the case of a perpendicular discharge conveyor 7 or a parallel discharge conveyor 4, 6. The oblique orientation of the push arm 202 in FIG. 5a might be suitable in particular for use with the oblique discharge conveyor 5 and is in particular important when pieces of luggage are to be conveyed.

Using the sorting device 1 it is in principle possible to sort out products both towards the inner side and towards the outer side of the conveying path, also if products are only supplied from the outer side, for example by means of the supply conveyors 19 in FIG. 1. As the figure shows, the pusher element 201 associated with the sorting unit 2 is located on the outer side of the conveying path at the location of the end of the front supply conveyor 19, with the end of the supply conveyor 19 being positioned directly above the push arm 202, as a result of which loading of the sorting unit 2 in question takes place past the upper side of the push arm 202, thus making it possible to sort out products on the inner side, for example at the location of the parallel discharge conveyor 4.

Figure 6:
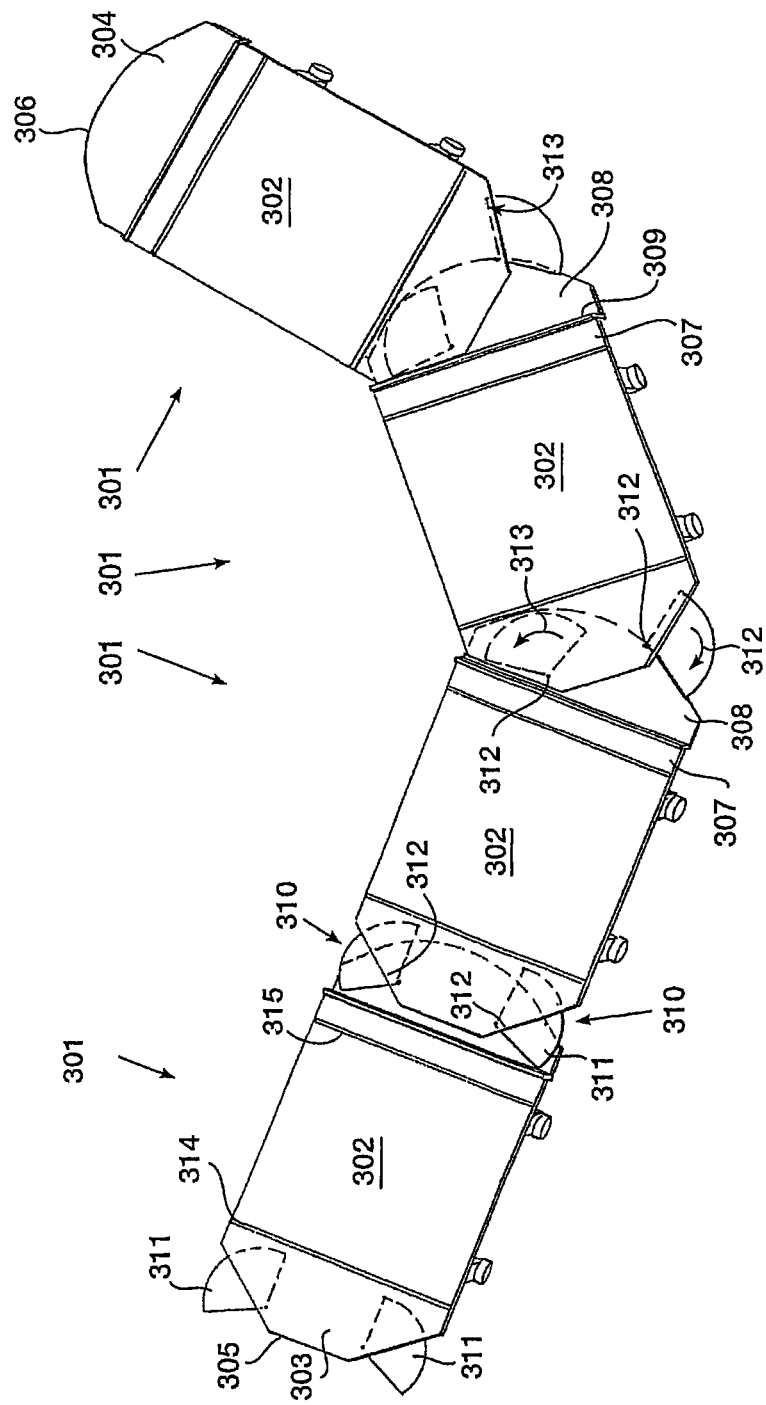
FIG. 6 is a perspective top plan view of four successive sorting units.

FIG. 6 shows four successive sorting units 301, which form part of an endless train (not shown) of sorting units 301. For clarity of illustration the associated pusher elements, which are comparable to the pusher elements 201, are not shown. Each sorting unit 301 comprises a carrier configured as a rectangular carrying blade 302. Each sorting unit 301 is provided both at the front side and at the rear side of the carrying blade 302 with a closing element configured as a substantially D-shaped (whether or not in mirror image), seen in top plan view, closing blade 303, 304 having convex outer edges 305, 306. The outer edges 305 have an angular shape with straight parts, whilst the outer edges 306 are curved. The convex shape of the outer edges 305 and 306 enables the sorting units to pass through bends without the associated closing blades 303 and 304 colliding with an adjacent sorting unit, as is clearly shown in FIG. 6.

The closing blades 303, 304 overlap, with the closing blade 303 extending above the associated closing blade 304 at least in the overlapping area. It is conceivable in that regard that each closing blade 304 is supported on a link of an drive chain extending therebelow via a connecting arm comparable to the connecting arm 51, 52 or 151. The closing blades 304 are made up of a strip-shaped part 307 and a slightly lower part 308 provided with the curved edge 306. The strip-shaped part 307 and the lower part 308 are connected to each other via a vertical strip member 309. Guide slots 314, 315 are provided between the carrying blades 302 and the closing blades 303, 304 for guiding guide members, such as the guide members 207, 208.

Segmental further closing elements 311 are provided between the overlapping closing blades 303, 304, more specifically between the closing blade 303 and the lower part 308 of the closing blade 304, near the longitudinal edges, at the location where, in a rectilinear part of a conveying path, the convex edges 305, 306 of the closing blades 303, 304 define at least substantially triangular surfaces 310 within the width of the sorting units 301, on the longitudinal sides of said sorting units 301. Said further closing elements 311 are pivotally connected to the closing blade 303 about vertical pivot axes 312 located near the point of the segmental shape of said further closing elements. Said further closing elements 311 tend to pivot in the direction indicated by the arrow 313 under the influence of a torsion spring (not shown), causing said further closing elements 311 to abut against an associated vertical strip member 309 with a point thereof.

The abutment of the closing element 311 against the vertical strip member 309 will cause further closing elements 311 located on the side of an inside bend to pivot inwardly against the action of the torsion spring and move below the associated closing blade 303 in their entirety. A triangular free area as described above is altogether absent in the inside bend.

In the outside bend, on the other hand, the triangular free area becomes larger. In order to be able to follow this shape, as it were, as it becomes larger and to continue to cover said area as well as possible, the closing elements 311 located on the side of an outside bend are carried along by the closing blade 303. The closing blade 303 is to that end provided with a downwardly extending projection at the location indicated by reference numeral 313, whilst the further closing element 311 is provided with an upwardly extending projection, which is engaged by said downwardly extending projection to move along therewith.

As a result of the use of the closing blades 303 and 304, the area between the carrying blades 302 of successive sorting units 301 is screened. This effect is further enhanced by the action of the further closing elements 311.

Incidentally, it is noted that if the conveying path would only comprise bends having the same orientation, the closing blades 303, 304 would only need to be bevelled/rounded on one side, viz. on the side of the inside bend(s), in which case the closing blades 303, 304 would be rectangular in shape on the side of the outside bend(s) and no further closing elements 311 would be needed there. In that connection it is also possible, for example, for the closing elements, which are only used on one longitudinal side, therefore, to have a vertical pivot axis extending through an associated closing blade on the outer side of the sorting unit.

The invention claimed is:

1. A sorting device for sorting products, comprising:
   a plurality of sorting units;
   conveying means for moving the sorting units in a conveying direction along a conveying path, said sorting units each comprising a carrier including a supporting surface for independently supporting a product to be sorted;
   removing means for moving the product to be sorted off the supporting surface at a desired sorting location,
   wherein the removing means comprises on each sorting unit a pusher element disposed above the supporting surface of the respective sorting unit, and comprises moving means for moving the pusher element laterally at a sorting location so as to have the pusher element independently push the product to be sorted off the supporting surface,
   wherein the removing means comprises on each sorting unit a first guide for guiding a first guide member connected to a part of the pusher element and a second guide for guiding a second guide member connected to another part of the pusher element, said first and second guides guiding said first and second guide members during said lateral moving of the pusher element, wherein said first and second guide members are each pivotally connected to said pusher element about a respective pivot axis extending perpendicularly to the associated supporting surface.

2. A device according to claim 1, wherein the first guide member and the second guide member are provided on two opposite ends of the pusher element.

3. A device according to claim 1, wherein at least one of the first and second guide members is slidably connected, in a direction parallel to the supporting surface, to another part of the pusher element.

4. A device according to claim 1, wherein a length of the pusher element is variable.

5. A device according to claim 4, wherein the pusher element is of telescopic type.

6. A device according to claim 1, wherein the first guide and the second guide are provided on two opposite sides, seen in the conveying direction, of the supporting surface of the sorting unit.

7. A device according to claim 1, wherein the conveying means comprises a driven chain, to which each of the sorting units is connected.

8. A device according to claim 7, wherein the conveying means comprises friction-type drive means, which frictionally engage flanks of the chain for driving the chain.

9. A device according to claim 7, wherein the sorting units are pivotally connected to the chain about two still further pivot axes extending perpendicularly to the supporting surface at two connecting positions located one behind the other, seen in the conveying direction, while the sorting units are slidably connected to the chain at the location of at least one of the two connecting positions.

10. A device according to claim 7, wherein the chain extends centrally below the sorting units, seen in a direction transversely to the conveying direction.

11. A device according to claim 1, wherein said supporting surface is a closed surface.

12. A device according to claim 1, further comprising a supply conveyor supplying products to be sorted to a sorting unit, with a downstream end of said supply conveyor terminating at a higher level than the upper side of pusher elements passing the downstream end of the supply conveyor.

13. A device according to claim 12, wherein the downstream end of the supply conveyor at least partially extends directly above a part of the passing pusher elements.

14. A device according to claim 1, wherein the sorting units each include a closing element both at a front end and at a rear end of the carrier for closing a gap between the carrier and an adjacent carrier, wherein closing elements of successive sorting units partially overlap and have an at least substantially convex edge at their facing sides, at least on one longitudinal side of the sorting units.

15. A device according to claim 14, wherein convex edges of closing elements of successive sorting units define at least substantially triangular areas within the width of the sorting units in a rectilinear part of the conveying path on at least one of longitudinal sides of the sorting units, which areas are at least partially closed by a further closing element, which is movably connected to one of said closing elements.

16. A device according to claim 15, wherein said further closing element is pivotally connected to one of the closing elements about a vertical closing pivot axis.

17. A device according to claim 16, wherein said further closing element is segmental in shape, with said vertical closing pivot axis extending near a point of segmental shape.

18. A device according to claim 15, wherein said further closing element abuts against a stop member under spring pressure.

19. A device according to claim 1, wherein the sorting units are pivotally interconnected about a vertical pivot axis.

* * * * *